United States Patent [19]

Mills

[11] Patent Number: 4,988,278
[45] Date of Patent: Jan. 29, 1991

[54] PULTRUSION APPARATUS INCLUDING A MOLDING DIE

[75] Inventor: Stuart D. Mills, Bartlesville, Okla.

[73] Assignee: Phillips Petroleum Company, Bartlesville, Okla.

[21] Appl. No.: 411,300

[22] Filed: Sep. 22, 1989

Related U.S. Application Data

[62] Division of Ser. No. 144,298, Jan. 14, 1988, Pat. No. 4,900,499.

[51] Int. Cl.⁵ .............................................. B29C 47/12
[52] U.S. Cl. ..................................... 425/466; 72/468; 72/473; 156/441; 156/500
[58] Field of Search ................. 72/274, 281, 282, 285, 72/278, 468, 473; 156/180, 441, 500; 425/461, 466; 264/136, 137

[56] References Cited

U.S. PATENT DOCUMENTS

| 569,335 | 10/1896 | Hudson | 72/468 |
|---|---|---|---|
| 1,392,919 | 10/1921 | Craig | 72/468 |
| 2,007,301 | 7/1935 | Lemieux | 72/468 |
| 2,379,088 | 6/1945 | Koppel | 72/473 |
| 3,244,784 | 4/1966 | Boggs | 156/441 |
| 3,378,884 | 4/1968 | Meteer | 156/180 |
| 4,201,534 | 5/1980 | Phipps | 425/466 |
| 4,445,957 | 5/1984 | Harvey | 156/180 |
| 4,680,224 | 7/1987 | O'Connor | 428/294 |

FOREIGN PATENT DOCUMENTS 0125472 11/1984 European Pat. Off. ............ 264/136

Primary Examiner—Willard E. Hoag
Attorney, Agent, or Firm—Richmond, Phillips, Hitchcock & Umphlett

[57] ABSTRACT

Pultrusion apparatus and tongue-in-groove die is provided for the fabrication of thermoplastic tape containing long fiber reinforcement. The tongue-in-groove die includes a first mold half having a groove and a pair of protruding wall portions which form sidewalls for the groove, and a second mold half having a tongue to match the groove. The second mold half is juxtaposed with respect to the first mold half so as to define a wedge-shaped passage between the tongue and the groove which has an inlet and an outlet and which converges from the inlet to the outlet. The tongue-in-groove die further includes a mechanism for adjusting the inlet and outlet clearances between the tongue and groove at the inlet and outlet respectively.

11 Claims, 2 Drawing Sheets

PULTRUSION APPARATUS INCLUDING A MOLDING DIE

BACKGROUND OF THE INVENTION

This application is a division of application Ser. No. 144,298, filed Jan. 14, 1988, U.S. Pat. No. 4,900,499, issued Feb. 13, 1990.

In one aspect, this invention relates to a die formed from two mold halves. In another aspect, the invention relates to a method for producing a tape containing reinforcing fibers in a continuous thermoplastic matrix.

A process for preparing shaped objects of continuous fiber strand material in a poly(arylene sulfide) matrix is disclosed in U.S. Pat. No. 4,680,224, issued Jul. 14, 1987 to James E. O'Connor. Dies for producing tapes or strips are shown in FIGS. 3, 4 and 5 of this patent. The present invention provides an improved die design for producing tapes or strips which can be usefully employed in a process of the general type disclosed in this patent.

OBJECTS OF THE INVENTION

It is an object of this invention to provide a new die for forming tapes or strips containing unidirectional fiber reinforcement in a continuous thermoplastic matrix.

It is another object of this invention to provide a process for forming a tape or strip containing long fiber reinforcement in a continuous thermoplastic matrix.

SUMMARY OF THE INVENTION

In one embodiment of the invention, there is provided a tongue-in-groove die for consolidating a thermoplastic tape. The die has a first end and a second end and comprises a first mold half having a groove and a second mold half having a tongue to match the groove in the first die half. The second mold half is juxtaposed with respect to the first mold half and a wedge shaped passage is defined between the tongue and the groove which extends at least partially through the die from the first end to the second end of the die. The passage defined between the two mold halves converges from the first end of the die to the second end of the die. By providing a tongue-in-groove die, the width of the tape produced can be precisely controlled and requisite high pressures applied to the tape during the consolidation process. By forming the die halves with near zero clearance at the outlet end, consolidation pressure can be adjusted to achieve good wetout of fiber and formation of tape over varying feed rates of fiber and/or resin.

In another aspect of the invention, there is provided a process for forming a tape comprising long fiber reinforcement in a continuous thermoplastic matrix. According to the process, there is provided at least one roving of long fibers carrying a dispersion of the desired thermoplastic. The at least one roving is introduced into an inlet of a converging wedge-shaped passage defined between a tongue and a groove and which converges from the inlet to an outlet and is bounded by sidewalls for the entire length of the groove. The sidewalls are separated by a predetermined distance desired to be replicated in the tape. Sufficient heat and pressure is applied to the roving carrying the dispersion while in the wedge-shaped passage to consolidate the thermoplastic and form the tape which comprises the long fiber reinforcement in the continuous thermoplastic matrix. The inventive process provides for better consolidation of product over a wider range of input variables than was possible using the apparatus of the prior art.

DETAILED DESCRIPTION OF THE INVENTION

Figure 1:
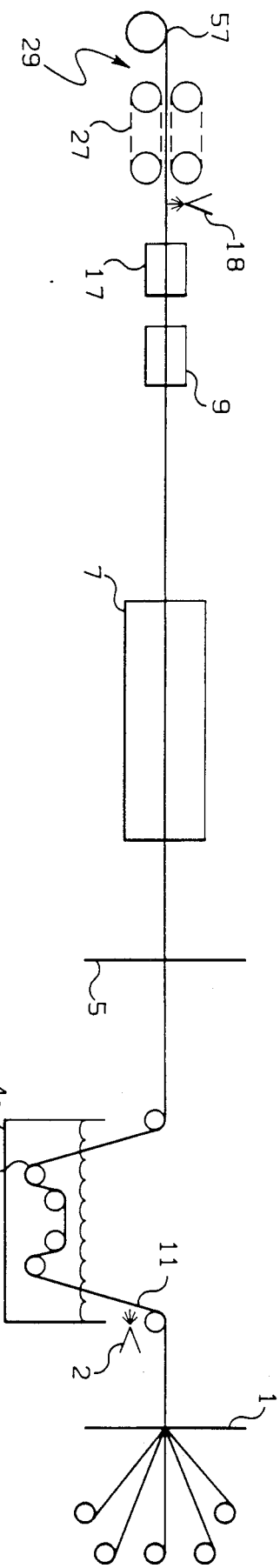
FIG. 1 schematically illustrates a process into which the present invention can be incorporated.

In FIG. 1, at least one roving or strand, preferably a multiplicity of strands, are passed through roving guide 1 and optionally past spray nozzle 2. A flow of gaseous fluid is emitted from the nozzle 2 to contact with the strand material with sufficient velocity to spread strands so that single filaments or bundles of single filaments are separated providing space therebetween so that subsequent contact with polymer slurry can be more effective. For the purpose of this invention, air is adequate as the gaseous fluid. Each strand is passed around several redirect bars 3 which cause the spreading of the fiber strands in the bath 4 which contains an aqueous slurry of thermoplastic particles in slurry form so that individual filaments will have better contact with the polymer particles. Alternatively, the contact can be with particles in the form of a dry powder.

Impregnated fiber strands are then pulled through a guide mechanism 5 for alignment for passage through optional heated drying chamber 7 to remove the slurry diluent where slurry impregnation has been used to provide a dry strand or multiplicity of strands carrying a dispersion of polymer which is then pulled through optional preheating chamber 9 and introduced in the heated die 17 having a construction according to the invention.

The rovings or strands with the dispersed thermoplastic resin become consolidated in the die 17 and are withdrawn from the die 17 by a pulling means 29 such as a gripping, pulling mechanism 27 of the type commonly used in pultrusion processes or a rotating mandrel 57 upon which the material could be spooled or which could be utilized to filament wind a fiber reinforced hollow thermoplastic object. Where the mandrel 57 carries a spool, the material taken up is usually referred to as a prepreg which can be cut, stacked and compression molded together to form multi-layer laminates of great structural strength.

Suitable thermoplastic resins useful for forming the continuous thermoplastic matrix are well-known. For example, polyolefins such as polypropylene can be used. Polyesters, polycarbonates, and polyamides such as "NYLON®" can also be used. High performance thermoplastics, the so-called engineering plastics, such as polyether-ether ketone (PEEK), and polyetherimide (such as "ULTEM®"), polyphenylene diketone (PPDK), and liquid crystal polymers are even more suitable. The preferred thermoplastic resins for use as the matrix material in accordance with the invention are selected from the family of aromatic sulfide polymers from the poly(arylene sulfide) (PAS) family. Poly(arylene sulfide) have the general formula (AR—X—AR—S)$_n$. The AR represents an aromatic unit which may be a mono or polycyclic moiety and X may be selected from at least one of the groups O, S, SO$_2$, CO, OCO, NCHO, etc. The PAS polymers are noted for their excellent chemical resistance, good thermostability, and physical strength. Poly(phenylene sulfide), which consists of a polymer backbone of alternating aromatic rings and divalent sulfur atoms has been used with good results. One type of suitable poly(phenylene sulfide) is a commercial engineering thermoplastic resin that is semi-crystalline in nature with a glass transition temperature of about 85° C. and a crystalline melting point of about 285° C. sold under the trademark "RYTON®" PPS by Phillips 66 company of Bartlesville, Oklahoma.

The fiber reinforcement suitable for use in the present invention can be selected from a wide variety of materials. The only constraint is that the fiber must not decompose prior to reaching the processing temperature for the resin selected as the matrix material. For poly(arylene sulfide) resin, glass fibers, carbon fibers, and aramid fibers such as "KEVLAR®" fibers are most preferred. Continuous length fibers in the form of a roving are preferred.

The particle size of the thermoplastic resin in the slurry bath 4 will usually be on the order of the diameter of the individual filaments in the roving 11 passing through the bath. The slurry liquid is preferably water. For many applications, the individual particle size in the slurry will be principally 20 microns or less. Surfactant and agitation are used to maintain uniform particle concentration in the slurry. Makeup slurry is preferably added to maintain a uniform amount of particle pickup by the fiber rovings. Generally speaking, the feed to the die 17 will generally contain on the order of from about 30 to about 80 wt. % of reinforcing filaments, the remainder of the feed being the thermoplastic matrix material, generally in the form of a dispersion of particles carried by the roving material. Preferably, the die 17 comprises a heated die which is generally maintained at a temperature in the range of from about 310° C. to about 540° C., usually at a temperature in the range of from about 310° C. to about 400° C. Functionally speaking, the die will be maintained at a temperature which is sufficient, at the pressures found within the die, to soften the polymer sufficiently to wetout the reinforcing fibers and form a continuous thermoplatic matrix having no visible voids or splits. Usually, the die will be maintained at a temperature in the range of from about 10° C. to about 100° C. above the softening point of the polymer selected.

Figure 2:
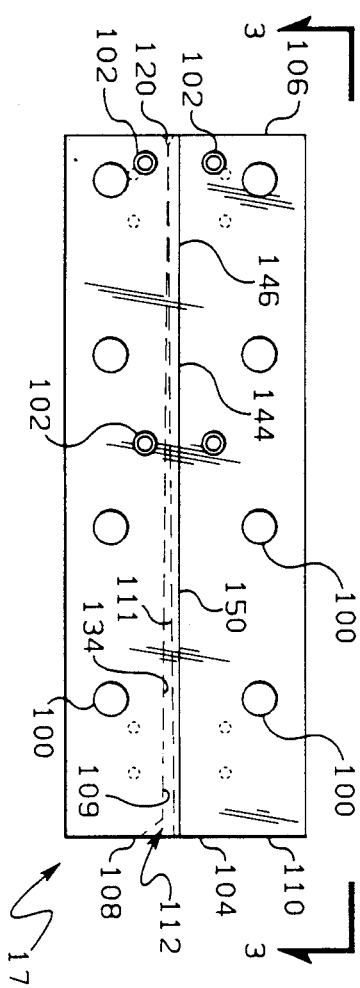
FIG. 2 is a side view of a die according to one embodiment of the present invention illustrating the passage through the die in dashed lines.

With reference to FIG. 2, the die can be heated by inserting electrical resistance heaters through one or more transverse passages 100 extending through the die 17. In the embodiment of the invention shown in the drawings, 500 watt Wattlow "fire rod" heaters, 5 inches long by ⅜ inch outside diameter, are employed four each in the top and bottom parts of the die, which has exterior dimensions of about 5 inches by 7 inches by 3 inches and is formed from AISI H13 alloy steel. Line speed through the die generally ranges from about 0.001 to about 10 meters/second, usually in the range of from about 0.002 to about 0.5 meters/second. Residence time in the die 17 generally ranges from about 0.03 seconds up to about 30 seconds and varies with the cross-section of the article and the softening point of the resin employed. The die has a sufficiently high temperature to soften the thermoplastic dispersion and matrix and a sufficiently small passage through it to consolidate the dispersion into the shaped structure. Preferably, the shaped structure exiting the die is cooled such as a by a cooling means 18, for example, one or more air spargers, so that the cross-sectional configuration of the passage through the die is replicated in the product taken up on mandrel 57. The temperature in the die can be determined by thermocouples inserted into transverse bores 102 extending transversely part way through the die.

Figure 3:
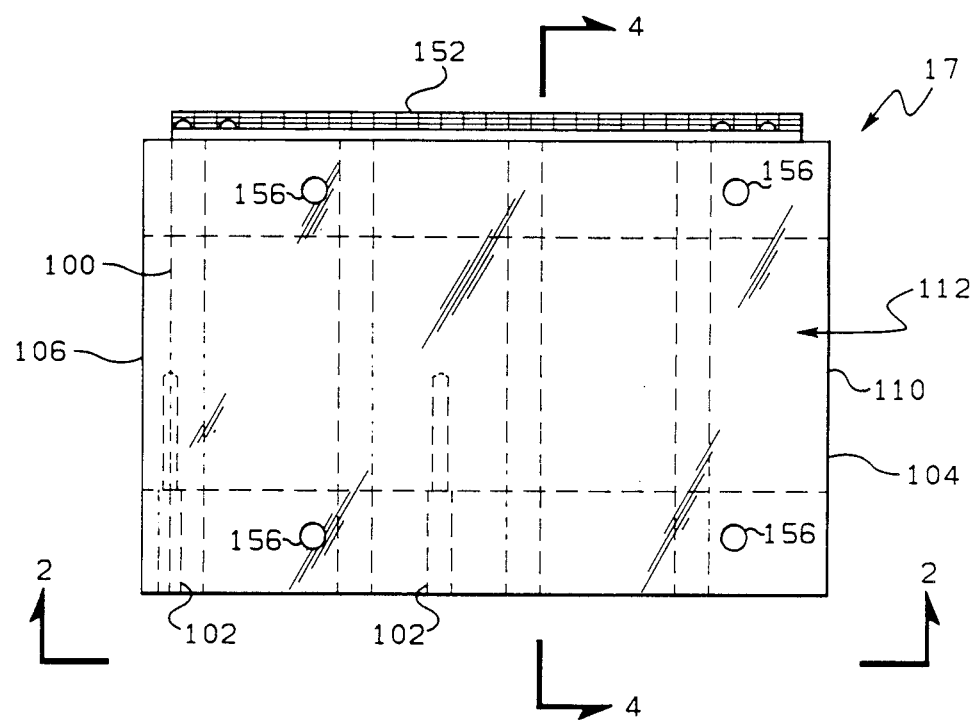
FIG. 3 is a plan view of the die illustrated in FIG. 2 when viewed along the indicated lines.
Figure 4:
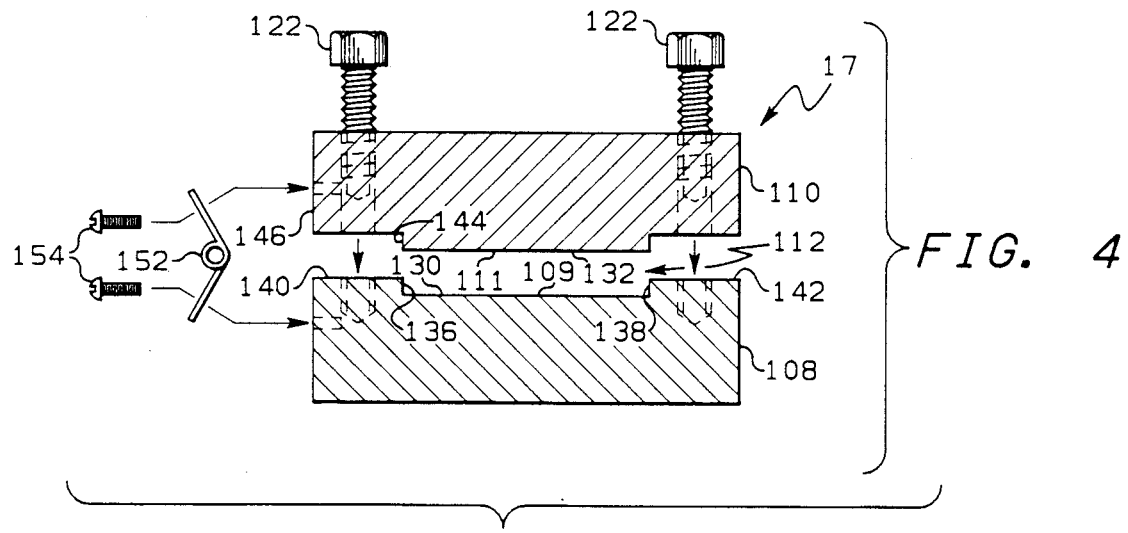
FIG. 4 is a cross-sectional exploded view of the die as shown in FIG. 3 as would be seen when viewed along the indicated lines.

Referring now to FIGS. 2 through 4, a tongue-in-groove die 17 having first end 104 and a second end 106 comprises a first mold half 108 having a groove 109 and a second mold half 110 having a tongue 111 to match the groove 109 in the first mold half 108. The second mold half 110 is juxtaposed with respect to the first mold half 108 and a wedge-shaped passage 112 is defined between the tongue 111 and the groove 109. The passage 112 has a longitudinal axis and extends at least partly through the die 17 converging from the first end 104 to the second end 106. The outlet 120 of the passage 112 through the die 17 is located near the second end 106 of the die and is generally near zero clearance. In a preferred embodiment, the outlet 120 can be adjusted to zero clearance by screws 122 when material is not present in the passage 112. It is contemplated that good results can be obtained when using the invention to make strips having a thickness in the range of from about 0.002 inches up to about 0.2 inches and a width such that the width to thickness ratio of the strip is at least 10 by employing a die which is adjustable at the outlet 120 to a dimension which is less than the nominal desired thickness of the strip. For example, in the production of strip 3 inches wide by approximately 0.007 inches thick an adjustable die to provide for an outlet gap 120 ranging from about zero to about 0.005 inches would be expected to provide good results. The mold half 108 and 110 can be chamfered at the inlet and outlet ends of the passage 112 if desired, for safety and reliable feeding of the material.

The first mold half 108 has a rectangular mold surface 130 forming the bottom of the groove 109. The second mold half 110 has a generally rectangular mold surface 132 on the top of the tongue 111. These rectangular surfaces are illustrated by the dashed lines in FIG. 3 and each has a major axis and a minor axis, the major axis being defined as the axis which extends between the ends of the die 17. The rectangular surfaces 130 and 132 determine first and second sides of the wedge-shaped passage 112 in the preferred embodiment of the invention. Preferably, the passage is symmetric so that the major axis of the rectangular surface 130 of the first die half, the major axis of the rectangular surface 132 of the second die half and the longitudinal axis of the wedge-shaped passage 112 all lie in the same plane.

As best shown by the dashed lines in FIG. 2, the wedge-shaped passage 112 preferably has triangularly shaped sides 134 which, with reference to FIG. 4, are determined by portions 136 and 138 of the first mold half 108. The sides 134 are preferably formed by a pair of parallel wall portions 140 and 142 respectively protruding from the first mold half 108 and running parallel to the major axis of the rectangular surface of the first mold half 108. The rectangular mold surface 130 connects the parallel wall portions 140 and 142 to form the sidewalls of the groove 109.

In a preferred embodiment, the tongue 111 on the second mold half 110 is formed by a wedge-shaped ramp portion 144 as best shown by the dashed lines in FIG. 2. This wedge-shaped ramp portion protrudes from a base portion 146 and defines the rectangular mold surface 132 of the second mold half 110. The wedge-shaped ramp portion 144 has a width which corresponds to the minor axis of the rectangular mold surface 132 and the wedge-shaped ramp portion 144 is closely received between the parallel wall portion 140 and 142 of the first mold half 108. Preferably, each of the rectangular mold surfaces 130 and 132 form an acute angle with a parting line 150 of the die 17. Generally speaking, the rectangular surfaces 130 and 132 will converge toward each other at an angle which is generally less than about 1°. In an embodiment of the invention which has been used with good results, the rectangular surfaces converge toward each other from an inlet gap of about 0.040 inches to an outlet gap of zero clearance which is adjusted open during use to result in the production of tape having a thickness of about 0.006 inches.

The die halves 108 and 110 are retained together by at least one hinge 152 in a preferred embodiment of the invention which is secured to each of the die halves by screws 154. The inlet and outlet clearances of the passage 112 are independently adjusted during use of the apparatus (at the same time that mold half 110 remains juxtaposed with respect to mold half 108 to define wedge-shaped passage 112) to provide a well consolidated product visually free from voids and splits by screws 122 preferably positioned in pairs of bore holes 156 near the first end 104 and the second end 106 of the die 17. The screws 122 are removed and die halves swung apart on hinge 152 when cleaning of the die is required. A brass putty knife is used for cleaning in order to avoid scratching the surfaces of the die. It has also proved to be desirable to weld T handles and washers onto the bolts 122 to facilitate dismantling and reassembly of the die.

The apparatus of the invention is generally used by a process which comprises providing at least one roving of long fibers carrying a dispersion of the thermoplastic from any of several means to the die. Preferably, the roving is impregnated with particles of the resin by slurry technique although fluidized bed or electrostatic technique could be used as well or, alternatively, the roving could be drawn through a bath of molten polymer to provide the dispersion. The at least one roving carrying the dispersion of thermoplastic resin is introduced into an inlet of a converging wedge-shaped passage defined between a tongue and a groove which converges from the inlet to an outlet thereof and which is bounded by sidewalls for the entire length of the passage. These sidewalls defining the grooves are separated by a predetermined distance. In the passage, sufficient heat and pressure is applied to the roving and the dispersion of the thermoplastic resin so that consolidation of the thermoplastic is effected. A tape or strip comprising the selected long fiber reinforcement in the continuous thermoplastic matrix is thus provided which can be optionally cooled and collected. The fibers in the tape can generally be characterized as unidirectional. To facilitate consolidation of resin, the process further comprises adjusting the pressure on the roving and the dispersion of thermoplastic resin by urging the die halves closer together at the outlet end of the passage. The clearance between the tongue and the groove at the outlet end of the passage is preferably adjustable to near 0, as determined visually, when the die is not in use.

That which is claimed is:

1. A tongue-in-groove die comprising;
   a first mold half having a groove and a pair of protruding wall portions which form sidewalls for the groove, said sidewalls being separated by a predetermined distance;
   a second mold half having a tongue to match the groove in the first mold half, said second mold half being juxtaposed with respect to the first mold half so as to define a wedge-shaped passage between the tongue and the groove which has an inlet and an outlet and which extends through the die from the inlet to the outlet, wherein the wedge-shaped passage converges from the inlet to the outlet and is bounded by the sidewalls for the entire length of the groove;
   means for adjusting inlet and outlet clearance between the tongue and groove at the inlet and outlet, respectively, wherein said adjusting means is capable of adjusting the inlet and outlet clearances at the same time that the second mold half remains juxtaposed with respect to the first mold half to define the wedge-shaped passage.

2. A die as recited in claim 1 wherein said adjusting means is further adapted to independently adjust the inlet and outlet clearances.

3. A die as in claim 1 wherein the first mold half has a rectangular mold surface at a bottom of the groove which determines a first side of the wedge-shaped passage, said rectangular mold surface of the first mold half having a major axis and a minor axis, and said second mold half has a rectangular mold surface on top of the tongue which determines a second side of said wedge-shaped passage, said rectangular mold surface of the second mold half having a major axis and a minor axis.

4. A die as in claim 3 wherein the wedge-shaped passage has a longitudinal axis and wherein the major axis of the rectangular surface of the first mold half, the major axis of the rectangular surface of the second mold half, and the longitudinal axis of the wedge-shaped passage all lie in the same plane.

5. A die as in claim 4 wherein the wedge-shaped passage has a pair of triangularly shaped sides which are formed by said wall portions protruding from the first die half and running parallel to the major axis of the rectangular surface of the first mold half, wherein the rectangular mold surface of the first mold half connects the wall portions.

6. A die as in claim 5 wherein the tongue on the second mold half is formed by a wedge-shaped ramp portion which protrudes from a base portion of the second mold half and defines the rectangular mold surface of the second mold half, wherein the wedge-shaped ramp portion has a width which corresponds to the minor axis of the rectangular mold surface of the second mold half and is closely received between the wall portions of the first mold half.

7. A die as in claim 6 wherein the rectangular mold surface of the first mold half and the rectangular surface of the second mold half converge toward each other at an angle measured between the rectangular mold surface of the first mold half and the rectangular mold surface of the second mold half which is less than about 1 degree.

8. A die as in claim 7 wherein the die has a first end and a second end and wherein the first mold half and the second mold half are chamfered at the first end of the die to form the inlet for the wedge-shaped passage and the first mold half and the second mold half come together near the second end of the die to form the outlet of the passage which has a clearance associated therewith ranging from zero up to about 0.005 inches as measured between the rectangular surface of the first mold half and the rectangular surface of the second mold half.

9. A die as in claim 8 wherein said means for adjusting inlet and outlet clearances is adapted to undependently adjust the inlet and outlet clearances.

10. A die as in claim 9 wherein said means for adjusting inlet and outlet clearances includes screws positioned near each of the first and second ends of the die.

11. An apparatus for forming a tape comprising long fiber reinforcement in a continuous thermoplastic matrix comprising:

a tongue-in-groove die which includes a first mold half having a groove and a pair of protruding wall portions which form sidewalls for the groove which are separated by a predetermined distance, a second mold half having a tongue to match the groove in the first mold half, said second mold half being juxtaposed with respect to the first mold half so as to define a wedge-shaped passage between the tongue and the groove which has an inlet and an outlet and which extends through the die from the inlet to the outlet, wherein the wedge-shaped passage converges from the inlet to the outlet and is bounded by the sidewalls for the entire length of the groove, said tongue-in-groove die further including means for adjusting inlet and outlet clearances between the tongue and groove at the inlet and the outlet, respectively, such as to be capable of adjusting the inlet and outlet clearances at the same time that the second mold half remains juxtaposed with respect to the first mold half to define the wedge-shaped passage;

means for introducing at least one roving of long fibers carrying a dispersion of thermoplastic resin to the inlet of said tongue-in-groove die; and means for pulling said at least one roving through the wedge-shaped passage of the tongue-in-groove die such that said at least one roving is withdrawn from the tongue-in-groove die through the outlet.

* * * * *